Sept. 29, 1925.

D. C. MARTIN

SPRING CONTROLLING DEVICE

Filed July 23, 1923 2 Sheets-Sheet 1

1,555,473

Inventor
Delos C. Martin
By his Attorney
M. W. McConkey

Sept. 29, 1925.  1,555,473

D. C. MARTIN

SPRING CONTROLLING DEVICE

Filed July 23, 1923   2 Sheets-Sheet 2

Inventor
Delos C. Martin
By his Attorney
M. W. McConkey

Patented Sept. 29, 1925.

1,555,473

UNITED STATES PATENT OFFICE.

DELOS C. MARTIN, OF DETROIT, MICHIGAN, ASSIGNOR TO MOTOR INDUSTRIES, INC., OF CHICAGO, ILLINOIS. A CORPORATION OF ILLINOIS.

SPRING-CONTROLLING DEVICE.

Application filed July 23, 1923. Serial No. 653,115.

*To all whom it may concern:*

Be it known that I, DELOS C. MARTIN, a citizen of the United States and resident of Detroit, in the county of Wayne and State of Michigan, have invented certain Improvements in Spring-controlling Devices, of which the following description, in connection with the accompanying drawings, is a specification, like reference characters on the drawings indicating like parts in the several figures.

This invention relates to devices for controlling the action of springs, and is illustrated as embodied, in several modifications in snubbers for use in motor vehicles.

One object of the invention is to vary the action of such devices according to the load on the springs, so that the action will be a maximum when the vehicle is unloaded, and is reduced when it is heavily loaded, so that the inertia of the load has a substantial spring-controlling action. From this point of view the invention contemplates resisting the spring action in a plurality of distant stages, as for example by using a plurality of successively-effective springs to resist relative movement of members connected to sprung and unsprung parts of the vehicle.

In the illustrated embodiments, relative rotation of a pair of wedge members successively compresses coaxial helical springs of different lengths. In one desirable arrangement the opposite ends of the springs are confined by an anti-friction thrust bearing. In another and less expensive construction which is preferred for the cheaper cars, one of the springs is anchored at its ends to the end of the inclosing casing and to one of the wedge members, in such a manner that the spring itself serves as a bearing. This construction has the additional advantages of utilizing the spring as both a torsion and compression spring, so that it may be made lighter, and of making certain that the wedge member will return quickly to its normal position under the influence of the torsional resilience of the spring.

From another point of view the invention contemplates utilizing the torsional resistance of a compression spring to return the parts to normal position, so that relative movement of the sprung and unsprung parts is resisted by the spring both as a torsion spring and as a compression spring. This not only provides for returning the parts with certainty, and makes possible the use of a lighter spring, but also eliminates all friction between the spring and the members by which it is compressed.

Other objects and features of the invention, including a construction permitting the use of relatively inexpensive sheet metal stampings for certain parts, a novel arrangement to facilitate lubrication, the elimination of axial movement of the shaft by arranging the wedge slidably but non-rotatably thereon, the use of a stiff cable to return the movable parts positively to normal position, and various other novel combinations and desirable particular constructions of parts, will be apparent from the following description of the embodiments shown in the accompanying drawings, in which.

Figure 1:
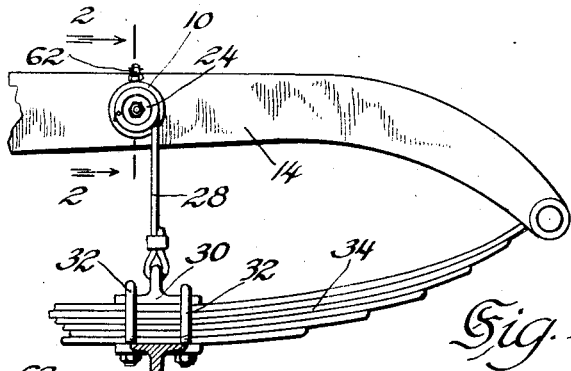
Fig. 1 is a side elevation of part of a vehicle, showing the connection of a snubber to sprung and unsprung parts.
Figure 2:
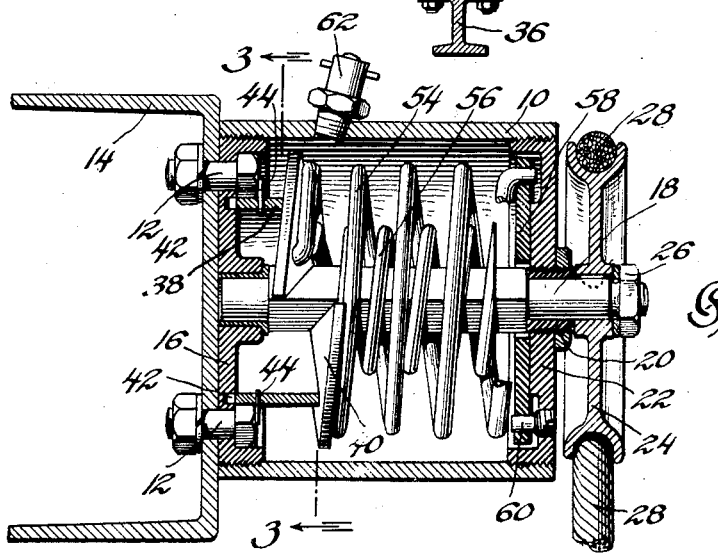
Fig. 2 is a section on the line 2—2 of Fig. 1, showing the snubber in longitudinal vertical section.
Figure 3:
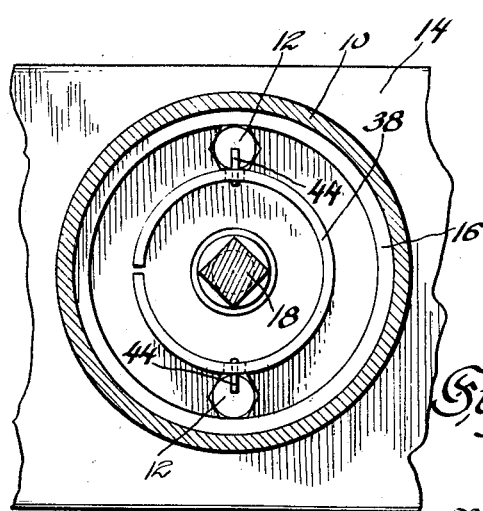
Fig. 3 is a section generally on the line 3—3 of Fig. 2, i. e. just above the fixed wedge.
Figure 4:
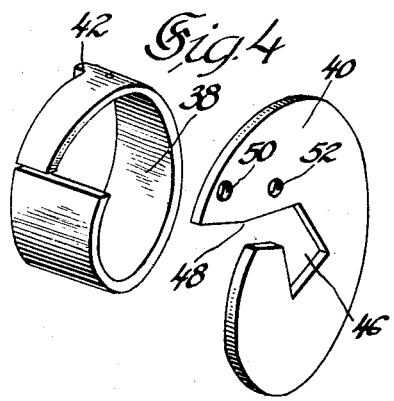
Fig. 4 is a perspective view of the two wedge members.

The invention is illustrated in the drawings as embodied in several different forms of snubbers,—i. e. devices which do not resist the movement of the sprung and unsprung parts toward one another, but which resist and cushion the reverse or rebound movement. As is well known, it is this rebound action which is responsible for most breakage of vehicle springs and other damage.

In the form shown in Figs. 1–4, there is a casing 10, shown as being cylindrical, and which is secured by bolts 12 to a part 14 of the chassis frame of a vehicle, or to any equivalent sprung part. The bolts 12 engage a head 16 threaded into the inner end of casing 10, and this head is provided with a bearing for one end of a shaft 18 having cylindrical end portions and a central portion of square or other polygonal cross-section. The outer end of the shaft is journaled in a bearing in the form of a bushing 20 threaded into a head 22 in the outer end of casing 10, where it is held by a lock-nut as shown. Beyond the bushing a pulley 24 is keyed to the shaft and held by a nut 26.

The shaft 18 is connected to an axle or equivalent unsprung part of the vehicle by a cable 28 connected to the pulley 24 at one end, and at the other end to an eye on a member 30 held by U-bolts 32 which clamp the spring 34 to the axle 36. According to one feature of the invention the cable 28, instead of being a mere flexible strap as heretofore used, which would buckle and break when the device is subjected to rapidly repeated shocks, is stiff, being a metal cable, and thus positively moves the various parts so that no slack can form to permit breaking the cable by a sudden snap.

Inside of casing 10 are two cooperating spiral wedge members 38 and 40. The member 38 is shown as being a sheet metal stamping of trapezoidal form bent into a circle to form a spiral wedge, and having projections 42 to enter sockets in head 16 to lock the wedge member in place. The stamping also may have holes to receive pins 44 which prevent bolts 12 from becoming loose and rattling during shipment. The member 40 is shown as a sheet metal disk, or washer, having a polygonal opening 46 to hold it slidably but non-rotatably on the shaft 18, and is split radially at 48, the ends being bent in opposite directions to form a spiral wedge surface to engage the wedge member 38.

The member 40 is perforated at 50 and 52 to receive the bent ends of a pair of coaxial helical springs 54 and 56 surrounding shaft 18, and which, according to an important feature of the invention, are arranged to be effective successively, so that when the vehicle is heavily loaded only the spring 54 is effective, whereas when the vehicle is lightly loaded both springs are effective. As one way of securing the desired result, the spring 56 may be shorter than the spring 54, as shown, the end of spring 54 being adjustably held by being turned out and inserted in a hole in a spring retainer or disk 58 held in any desired adjusted position by a setscrew 60 seated in any one of a plurality of angularly-spaced holes in the disk 58. Disk 58 is shown as fitting in a recess in head 22, to hold it in position, but if desired it may be sleeved on a smooth cylindrical bearing formed on shaft 18 or on a continuation of bushing 20. It will be seen that spring 54, secured in this manner, forms in effect a floating bearing for wedge member 40. Casing 10 is substantially filled with lubricant introduced through a fitting 62.

When the device is first mounted on a vehicle, the shaft 18 is at first 180° from its normal position. After the casing 10 is attached, cable 28 is pulled down to turn shaft 18 to its normal position, and is then attached as shown, the spring 54 thus being normally under a substantial tension.

In operation, when frame 14 and axle 36 approach each other as the vehicle passes over an inequality in the road surface, cable 28 tends to be wound on pulley 24, and the wedge members to seek their lowest position, the tension of spring 54 and the stiffness of cable 28 cooperating to turn shaft 18 and with it the wedge member 40. On the rebound, spring 54, acting as a combination compression and torsion spring, promptly and vigorously resists separation of frame 14 and axle 36. After the separation passes a predetermined limit, carrying the frame 14 substantially beyond its ordinary position when the car is lightly loaded, disk 58 engages and compresses spring 56 also, thus adding greatly to the resistance. For this reason, when the vehicle is heavily loaded, and the load itself controls the spring action to a certain extent by its inertia, spring 56 will seldom come into use, and therefore maximum snubbing action is secured only when it is needed.

Figure 6:
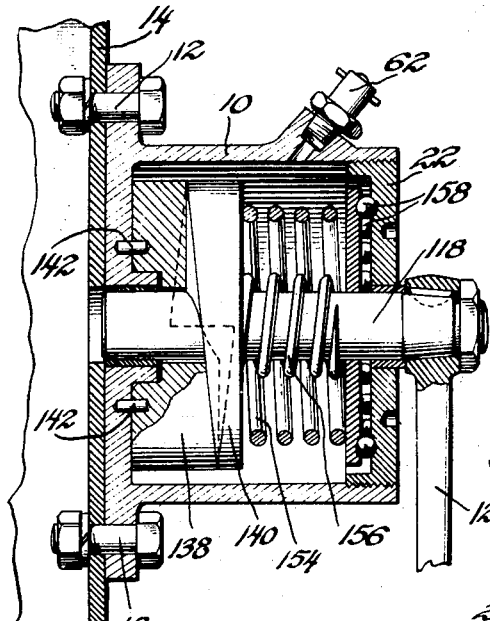
Fig. 6 is a section on the line 6—6 of Fig. 5, and corresponding to Fig. 2, but showing the modified form.
Figure 5:
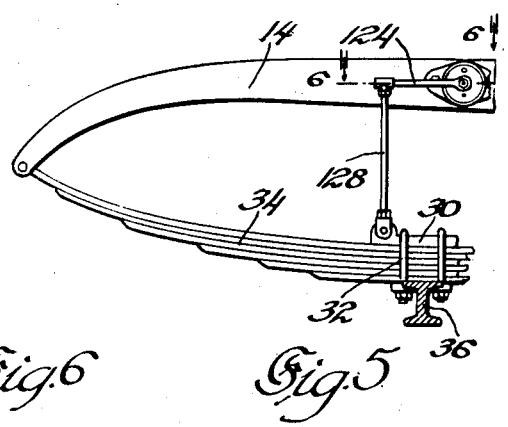
Fig. 5 is a view corresponding to Fig. 1, but showing a modified form of snubber connected to sprung and unsprung parts of a vehicle.

The snubber shown in Figs. 5 and 6 differs from the one described above, in that wedge members 138 and 140 are of solid metal, the former being locked to the casing by pins 142, and the latter secured to a shaft 118 which has a limited axial movement, and which carries an arm 124 connected by a link 128 to the member 30 on axle 36. Coaxial springs 154 and 156 of different lengths, are arranged between wedge member 140 and a ball thrust bearing 158. The operation is substantially as described above, except that spring 154 acts as a compression spring only, the rigid link 128 serving to make sure that the movable parts are returned to normal position.

Figure 7:
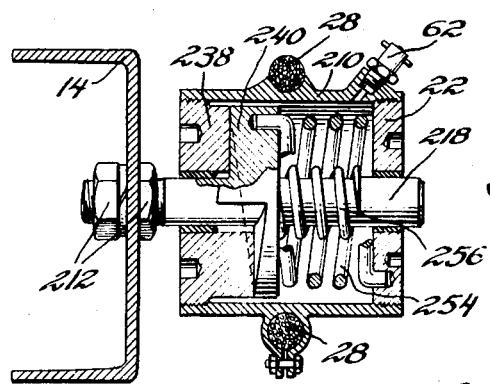
Fig. 7 is a section corresponding to Figs. 2 and 6, but showing a third modification.

In the modification shown in Fig. 7, casing 210 is rotatably mounted on shaft 218 clamped to the chassis frame 14 by locknuts 212. In this form, wedge member 238 is threaded into the end of casing 210, serving also as a head for the casing, and wedge member 240 is fixedly mounted on the shaft 218. Spring 254 has its ends turned out and seated in sockets in the stationary wedge 240 and end head 22 of casing 210, and the shorter spring 256 is arranged coaxially thereof and surrounding the shaft. In this form, cable 28 seats in an annular groove in the casing 210. The operation of this modification is the same as that of the first modification, except that the casing turns instead of the shaft.

Figure 8:
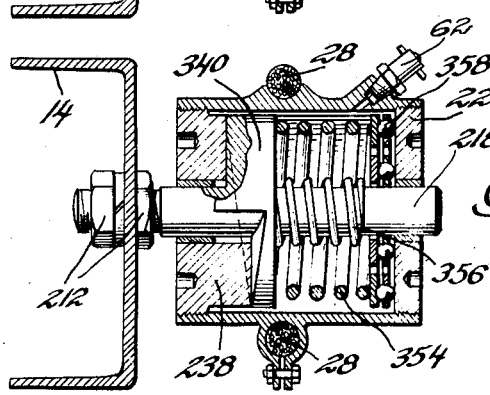
Fig. 8 is a section corresponding to Figs. 2, 6, and 7, but showing a fourth modification.

In Fig. 8 is shown a modification which differs from that of Fig. 7 in that spring 354, corresponding to spring 254, is not secured to wedge member 340 or head 22; and in that the springs 354 and 356 are confined between wedge member 340 and a ball thrust bearing 358. This modification operates like that shown in Figs. 5 and 6, except that the casing turns instead of the shaft.

While several embodiments of my invention are illustrated and described, it is not my intention to limit its scope to those embodiments, or to use on a motor vehicle, or otherwise than by the terms of the appended claims.

I claim:

1. A spring-controlling device comprising, in combination, members connected for relative angular movement and constructed and arranged to be attached respectively to sprung and unsprung parts of a vehicle, means to resist relative angular movement of said members, and auxiliary means additionally to resist relative movement of said members beyond a predetermined angle.

2. A spring-controlling device comprising, in combination, members connected for relative angular movement and constructed and arranged to be attached respectively to sprung and unsprung parts of a vehicle, a spring to resist relative angular movement of said members, and an auxiliary spring additionally to resist relative movement of said members beyond a predetermined angle.

3. A spring-controlling device comprising, in combination, a pair of wedge members arranged to be connected respectively to sprung and unsprung parts, a spring arranged to be compressed by relative movement of the wedge members, and a normally-idle spring arranged to be compressed by relative movement of the wedge members beyond a predetermined limit.

4. A spring-controlling device comprising, in combination, a pair of wedge members arranged to be connected respectively to sprung and unsprung parts, and a plurality of successively-effective springs arranged to resist relative movement of the wedge members.

5. A spring-controlling device comprising, in combination, relatively-rotatable members having cooperating spiral wedge portions, a spring continuously resisting relative rotation of said members, and an auxiliary spring resisting only relative rotation of said members beyond a predetermined limit.

6. A spring-controlling device comprising, in combination, relatively-rotatable members having cooperating spiral wedge portions, and helical springs of different lengths arranged to be compressed successively by relative rotation of said members.

7. A device as defined by claim 6, in which the springs are coaxially nested one within another.

8. A spring-controlling device comprising, in combination, a stationary wedge member constructed and arranged to be connected to the chassis frame of a vehicle, a coaxial angularly-movable wedge member constructed and arranged to be connected to the axle of the vehicle, an axially-fixed abutment, a spring confined between the abutment and the wedge members to be compressed by relative angular movement of the wedge members, and an auxiliary normally-idle spring arranged to be engaged and compressed by the abutment and wedge members after relative angular movement of the wedge members beyond a predetermined limit.

9. A spring-controlling device comprising, in combination, a stationary wedge member constructed and arranged to be connected to the chassis frame of a vehicle, a coaxial angularly-movable wedge member constructed and arranged to be connected to the axle of the vehicle, an axially-fixed abutment, and coaxial helical springs of different lengths arranged between the abutment and wedge members to be compressed successively by relative angular movement of the wedge members.

10. A spring-controlling device comprising, in combination, a stationary wedge member constructed and arranged to be connected to the chassis frame of a vehicle, a coaxial angularly-movable wedge member constructed and arranged to be connected to the axle of the vehicle, an axially-fixed abutment, and a plurality of springs confined by the abutment and constructed and arranged to be compressed successively by relative angular movement of the wedge members.

11. A spring-controlling device comprising, in combination, a casing having a fixed abutment in one end and a spiral wedge portion fixed in its opposite end, a relatively rotatable member within the casing having a cooperating spiral wedge portion, and a plurality of springs of different lengths arranged between the rotatable member and the fixed abutment.

12. A spring-controlling device comprising, in combination, a casing having a fixed abutment in one end and a spiral wedge portion fixed in its opposite end, a central shaft having rotatable therewith a member having a cooperating spiral wedge portion, and a plurality of helical springs of different lengths arranged between the rotatable member and the fixed abutment.

13. A device as defined by claim 12, in which the springs are arranged coaxially of each other and coaxially of the shaft.

14. A spring-controlling device comprising, in combination, a casing constructed and arranged to be secured to the chassis frame of a vehicle, a shaft journaled in the casing having means to be connected to the axle of the vehicle to be turned by movement thereof with respect to the chassis frame, a pair of cooperating wedge members in the casing, one fixed to the casing and the other turning with the shaft, and a plurality of successively-effective springs confined between the end of the casing and said wedge members.

15. A spring-controlling device comprising, in combination, a casing constructed and arranged to be secured to the chassis frame of a vehicle, a shaft journaled in the casing having means to be connected to the axle of the vehicle to be turned by movement thereof with respect to the chassis frame, a pair of cooperating wedge members in the casing, one fixed to the casing and the other turning with the shaft, and a plurality of coaxial helical springs of different lengths arranged about the shaft between the end of the casing and said wedge members.

16. A spring-controlling device comprising, in combination, a casing constructed and arranged to be secured to the chassis frame of a vehicle, a shaft journaled in the casing having means to be connected to the axle of the vehicle to be turned by movement thereof with respect to the chassis frame, a pair of cooperating wedge members in the casing, one fixed to the casing and the other turning with the shaft, a helical spring connected at one end to the end of the casing and at the other end to the movable wedge member, and an auxiliary and shorter helical spring arranged to be compressed by turning the movable wedge member beyond a predetermined limit.

17. A spring-controlling device comprising, in combination, relatively-movable members arranged to be connected respectively to sprung and unsprung parts of a vehicle, and a combination compression and torsion spring arranged to resist relative movement of said members.

18. A spring-controlling device comprising, in combination, members constructed and arranged to be connected respectively to sprung and unsprung parts of a vehicle, and to be rotated with respect to one another by relative movement of said parts, a helical spring connected to said members at opposite ends to resist such relative movement by its torsional resilience, and means operated by such relative movement to compress said spring.

19. A spring-controlling device comprising, in combination, relatively-rotatable wedge members connected respectively to the chassis frame and the axle of a vehicle, a spring-retainer connected to one of said wedge members, and a helical combination torsion and compression spring connected at one end to the retainer and at the other end to the other of said wedge members.

20. A spring-controlling device comprising, in combination, a casing member having a wedge portion, a relatively rotatable member having a cooperating wedge member, said members being constructed and arranged to be connected to the chassis frame and the axle of a vehicle, and a helical combination torsion and compression spring connected at one end to the end of the casing opposite the wedge portion and connected at its opposite end to the relatively rotatable member.

21. A spring-controlling device comprising, in combination, a casing, a shaft passing through the casing, a spiral wedge member in one end of the casing, a cooperating spiral wedge member in the casing and carried by the shaft, and a helical spring connected at one end to the end of the casing and at the other end to the wedge member carried by the shaft, to resist relative movement of the casing and shaft by both compression and torsion, and to serve as a floating bearing for the wedge member.

22. A spring-controlling device comprising, in combination a casing constructed and arranged to be secured to a chassis frame, a shaft rotatably mounted in the casing, a rotary member on the shaft arranged to be connected to the axle of the vehicle, a pair of wedge members in the casing and mounted respectively on the inner end of the casing and on the shaft, and a helical spring connected at one end to the outer end of the casing and at the other end to the wedge member connected to the shaft.

23. A spring-controlling device comprising, in combination, a casing having a spiral wedge portion in its end, a shaft passing through the casing, a flat radially-split disk slidably and non-rotatably mounted on the shaft and having its ends bent in opposite directions and arranged in the casing in engagement with the wedge portion, and means to resist relative angular movement of the shaft and casing.

24. A spring-controlling device comprising, in combination, a pair of cooperating relative-rotatable spiral wedges, and a pair of helical springs anchored to one of the wedges and arranged to resist relative rotation thereof.

In testimony whereof, I have signed my name to this specification.

DELOS C. MARTIN.